United States Patent

Clemot et al.

[11] Patent Number: 5,894,519
[45] Date of Patent: Apr. 13, 1999

[54] PROCESS FOR THE DISSIMULATON OF A SECRET CODE IN A DATA AUTHENTICATION DEVICE

[75] Inventors: Olivier Clemot, Antony; Mireille Campana; David Arditti, both of Clamart, all of France

[73] Assignee: France Telecom, France

[21] Appl. No.: 08/838,646

[22] Filed: Apr. 9, 1997

[30] Foreign Application Priority Data

Apr. 9, 1996 [FR] France .................. 96 04404

[51] Int. Cl.$^6$ ............................................. H04K 1/00
[52] U.S. Cl. .................. 380/23; 380/25; 380/4; 380/28
[58] Field of Search ..................... 380/4, 23, 24, 380/25, 28, 49

[56] References Cited

U.S. PATENT DOCUMENTS

| 5,233,655 | 8/1993 | Shapiro | 380/23 |
| 5,537,544 | 7/1996 | Morisawa et al. | 380/25 |
| 5,557,674 | 9/1996 | Yeow | 380/4 |
| 5,586,301 | 12/1996 | Fisherman et al. | 380/4 |

FOREIGN PATENT DOCUMENTS

| 0191324 | 8/1986 | European Pat. Off. | G07F 7/00 |
| 2690257 | 10/1993 | France | G06F 12/00 |

OTHER PUBLICATIONS

Baupiess et al; "Requirements for Cytographic Hash Functions"; Sep. 1992; pp. 427–437; Computers & Security, vol. 11, No. 5.

Ferreira; "The Smart Card: A high security tool in EDP"; Sep. 1989; pp. 1–19; Telecommunication Review, vol. 47, No. 3.

*Primary Examiner*—David Cain
*Attorney, Agent, or Firm*—Hayes, Soloway, Hennessey, Grossman & Hage, P.C.

[57] ABSTRACT

A process for the dissimulation of concealment of a secret code in a data authentication device by encrypting the secret code by an encrypting function for forming an image of the secret code and storing the secret code image in the authentication device. Beforehand, an encrypting function is chosen such that with each stored secret code image corresponds a plurality of antecedent codes all differing from the secret code, but which, once encrypted by the encrypting function have an image identical to that of the secret code. The secret code of a user has an authentication device in which is stored the secret code image.

4 Claims, 2 Drawing Sheets

PROCESS FOR THE DISSIMULATON OF A SECRET CODE IN A DATA AUTHENTICATION DEVICE

TECHNICAL FIELD

The invention consists of a process for the dissimulation or concealment of a secret code in an authentication device such as a floppy disk, smart card, etc., which can be read by an adequate reader.

It has applications in all computer systems using a procedure for authenticating users wishing to connect to the central system from a terminal.

PRIOR ART

In existing computer systems, data protection plays an ever more important part. Thus, the quality of the computer system is decisively dependent on the security of the data exchange within the system. Thus, there is an ever increasing need to securize access to the system, i.e. an attempt is made to check whether the persons using the system are authorized to do so, unauthorized persons then being refused by the system.

A simple implementation procedure, but not offering absolute security, consists of controlling access to the computer system by the checking of a pass word known only to the authorized user and which is often changed in order to limit the possibility of unauthorized users discovering this pass word. However, there are serious risks of pass words being intercepted by unauthorized persons wishing to use the computer system.

Moreover, said pass word is stored in the memory area of the computer system (protected or unprotected area) so that it can be compared with the pass word entered by the user. It can therefore easily be retrieved in the memory by a fraudulent user. To avoid this fraud, one procedure consists of encrypting the pass word before storing it in the memory. This encrypting takes place by means of an encrypting function generally chosen in such a way that it is impossible to retrieve the pass word from the image thereof obtained after encrypting said pass word. This procedure is e.g. used in UNIX$^{(R)}$ systems.

In this case, the pass word image is stored in uncoded form in the memory, so that it is possible for a fraudulent user to salvage the file of all the stored pass word images and then implement the encrypting function on another computer system and try lists of pass words until retrieving those corresponding to the images of the file. Such an analysis of the code of the system (function, file of pass word images, etc.) is called "access by dictionary".

Moreover, a process exists making it possible to dissimulate a secret code by storing, on storage means such as a floppy disk, smart card, etc., the image of the secret code by a reversible encrypting function parametrized by the pass word of the user. This process is implemented "locally", i.e. it is performed by the terminal in conjunction with the storage means and requires no connection to the central system. This process is described in detail in FR-A-2 690 257.

As explained in the aforementioned patent application, the process also makes it possible to locally change the user pass word, i.e. without any connection to the central system being necessary. However, a connection to the system is obligatory for checking the validity of said pass word change.

Therefore user authentication takes place locally and the secret code is never transmitted on a transmission line to the central system. The only transmission of the secret code during the process takes place between the storage means reader and the terminal, which limits the interception risks by a defrauder. The connection to the central system then takes place, i.e. after local verification of the secret code.

However, such a process requires a physical protection of storage means (floppy disk) to prevent direct fraud on said storage means. This consequently involves the use of specific hardware and technology, leading to relatively high costs.

DESCRIPTION OF THE INVENTION

The object of the invention is to obviate the disadvantages of the aforementioned processes. To this end, it proposes a process for dissimulating a secret code in an authentication device, such as a floppy disk or smart card. This process makes it possible to locally check the secret code entered by the user, whilst limiting dictionary access risks.

More specifically, the invention relates to a process for the dissimulation of a secret code in a data authentication device consisting of encrypting the secret code by an encrypting function to form a secret code image and storing said secret code image in the authentication device. This process is characterized in that it consists, beforehand, of choosing an encrypting function such that, with each secret code image corresponds a plurality of antecedent codes all differing from the secret code, but which, once encrypted by the encrypting function, have an image identical to that of the secret code.

Advantageously, the secret code having n characters, the encrypting function consists of associating with these n characters a secret code image with k characters, with k<n.

According to a preferred embodiment of the invention, the number k of characters of the image of the secret code is n/2.

The invention also relates to a process for the checking of the secret code of a user wishing to access a central system from a terminal. As said user is provided with an authentication device in which is dissimulated the image of the secret code by the encrypting function, said process is characterized in that it comprises a stage of locally checking the secret code entered by the user and encrypted by the encrypting function, by comparison with the image of the secret code stored in the authentication device and then, if this is checked, it consists of a stage of authenticating by the central system.

DETAILED DESCRIPTION OF EMBODIMENTS OF THE INVENTION

The invention relates to a process for the dissimulation or concealment of a secret code in an authentication device such as a floppy disk, smart card or pocket calculator.

This process consists of encrypting the secret code by an encrypting function g, so as to form an image of the secret code, which is then stored in the authentication device.

The encrypting function g is chosen in such a way that the image of the secret code is sufficiently precise that a typing error made by the user on entering his secret code can be detected with a satisfactory probability, but whereby each secret code image has numerous antecedents by the encrypting function, so that an access by dictionary supplies numerous false solutions to the local check, but not to the remote authentication.

In other words, the encrypting function g is chosen in such a way that the secret code has a secret code image corresponding to a plurality of antecedent codes (called "antecedents" in the remainder of the text). These antecedent codes are false secret codes which, encoded by the encrypting function g, all give the same secret code image as the true secret code of the user, but which would be refused during the authentication procedure.

Thus, a fraudulent user in possession of the authentication device, e.g. the floppy disk and who has discovered the file of the secret code images and who is also in possession of the encrypting function g, would not accurately be able to determine which is the secret code of the user. Thus, access by dictionary would supply him with numerous solutions to the local check, but only a very limited chance of finding the true solution, i.e. the real secret code. Thus, if the fraudulent user tries one of the antecedent codes supplied by the access by dictionary, it is locally checked. However, it will be refused during remote authentication, i.e. authentication by the central system.

Figure 1:
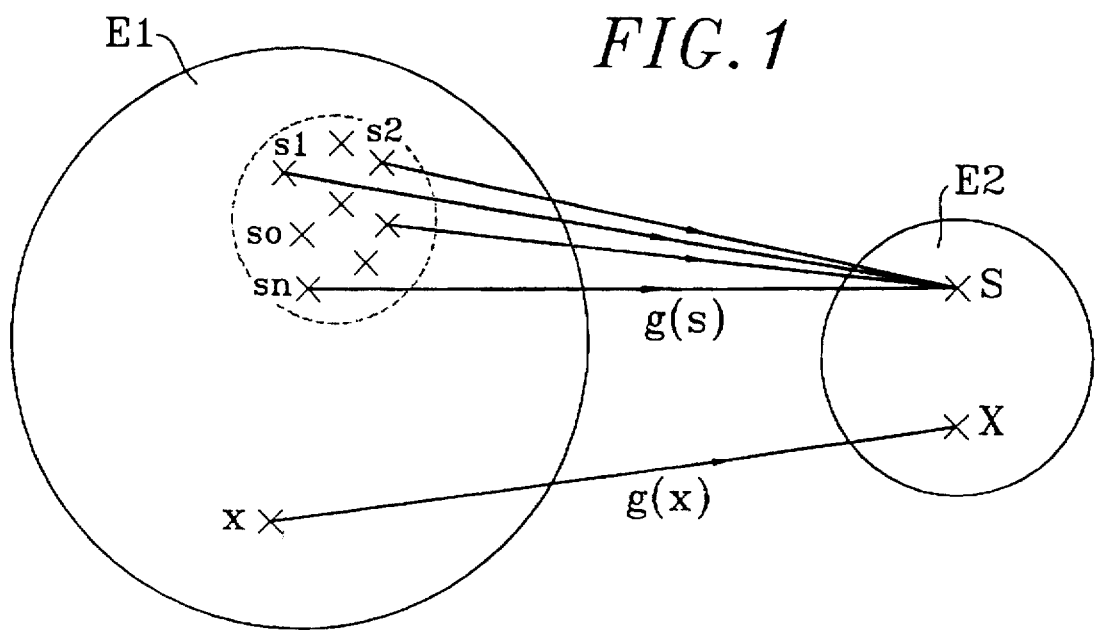
FIG. 1 diagrammatically shows the distribution of the images of the secret code in the memory, as well as possible antecedents of said image.

FIG. 1 very diagrammatically shows the distribution of the secret code images in the memory, as well as the distribution of the antecedent codes of said images of secret codes.

More specifically E1 relates to all the codes which could be a secret code chosen by the user and E2 all the images of said secret codes which could be chosen by the user. Thus, E1 has all the possible secret codes, including in particular a code x and a plurality of codes s1 to sn.

If g is the chosen encrypting function, then the image of the code x by the encrypting function g gives the image X within the group E2 of possible secret code images. Moreover, the image by the encrypting function g of each of the codes s1 to sn gives the secret code image S contained in the group E2.

Thus, all the antecedent codes s1, s2, s3, . . . , sn which, encoded by the encrypting function g, give an image S also corresponding to the image of the true secret code. Thus, one of these codes s1 to sn is the true secret code chosen by the user. Thus, although all these antecedent codes s1 to sn have the image S, only one of them is the true secret code which will verify the authentication by the central system.

Thus, a fraudulent user in possession of both the encrypting function g and the secret code image S would not know which of the antecedent codes s1 to sn to choose. In addition, on locally testing or trying, i.e. at the computer terminal, one of the antecedent codes s1 to sn, the check by the terminal will give him a positive answer, i.e. that an authentication procedure can be implemented. However, said authentication procedure will not be successful and connection to the central system will be refused.

However, the encrypting function is chosen in such a way that it supplies sufficiently precise secret code images to enable a typing error on the part of the user to be locally detected, i.e. without necessitating connection to the central system.

According to an embodiment of the invention, the encrypting function g is a function associating with n characters constituting the secret code, a reduced size secret code image, i.e. of k characters, with k<n. For example, for a secret code having n characters, the encrypting function g associates an image of k=n/2 characters. In the preferred embodiment of the invention, the function g associates with a secret code of eight characters (which corresponds to a size of approximately $2^{40}$ bits), a secret code image with four characters (size of approximately $2^{20}$ bits).

For an encrypting function g of this type, the user typing the true secret code with a typing error will have a risk of approximately 1 million cases (1 in 2) that his typing error will not be detected during the local verification operation. However, a fraudulent user attempting access by dictionary will be confronted with approximately one million solutions ($2^{20}$) among which only one is good, i.e. only one corresponds to the true secret code.

It is clear that several functions can be used for checking the aforementioned conditions. Even very simple functions can be used. For example, on taking into account the digits between 0 and 9 and the letters of the alphabet represented by values between 10 and 35, it is possible to choose a function g1 associating with each pair of characters (letters or digits) of the secret code of the user, a given value between 0 and 35, so that for a given character of the bigramme (i.e. the pair of characters), the image differs when the second character varies. It is e.g. possible to choose the sum of two values of the bigramme.

Figure 2A:
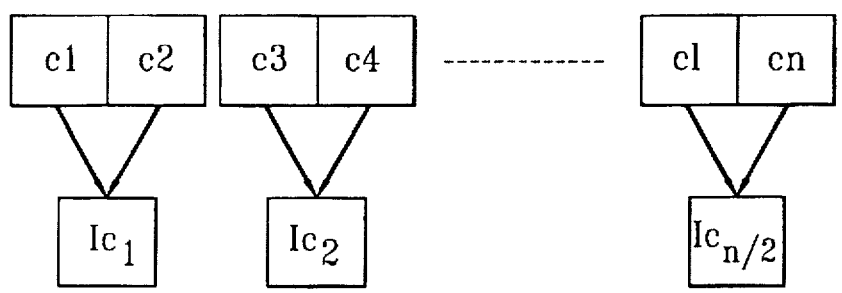
FIGS. 2A, 2B, 3A and 3B examples of encrypting functions applied to a certain number of numerics.

FIG. 2A diagrammatically shows the processing performed by the function g1 on a secret code having n characters.

FIG. 2A shows the n/2 pairs of characters (c1, c2) (c3, c4) . . . (c1, cn) and each of the images $Ic_1, \ldots, Ic_{n/2}$ of said bigrammes. On the basis of the definition of the function g1 given hereinbefore, each image $Ic_{n/2}$ corresponds to the sum of the characters $C_1$ and $C_n$ of the corresponding bigramme, knowing that if the sum of these characters gives a value equal to or higher than 10, for $Ic_{n/2}$ will be chosen the least significant value, namely the unity or last digit.

Figure 2B:
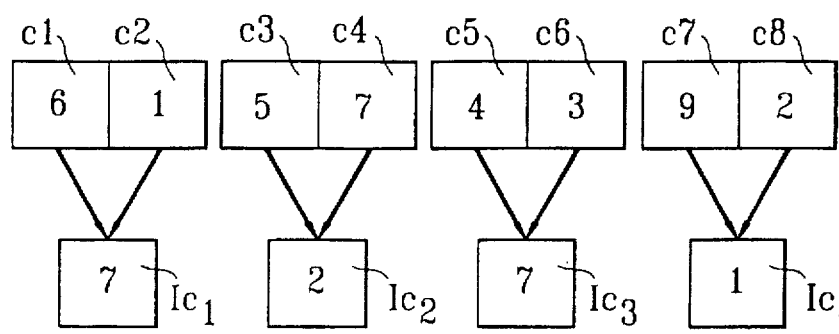

FIG. 2B shows a numerical example of the encrypting performed by means of the function g1. This example considers a secret code with eight numerical characters c1, c2, . . . , c8 grouped into four bigrammes, whose values are between 0 and 9:

(c1, c2)=(6,1)
(c3, c4)=(5,7)
(c5, c6)=(4,3)
(c7, c8)=(9,2)

Thus, the function g1 associates with each bigramme, the sum of two characters forming it, so that:

Σ(c1, c2)=7
Σ(c3, c4)=2
Σ(c5, c6)=7
Σ(c7, c8)=1

Thus, on the basis of this example, the image of the secret code 61574392 is 7271. Such an image 7271 can have a plurality of antecedents, because each character of this image of the secret code can be the result of the sum (or the unit of a digit corresponding to the sum) of a plurality of numbers between 0 and 35.

Thus, if the user typed the true secret code with a typing error, e.g. 7 in place of 6 for the character c1, this error would then be locally detected, because the sum of 7 and 1 can obviously not give the FIG. 7, which corresponds to the image Ic1 of the first pair of characters (c1, c2).

Figure 3A:
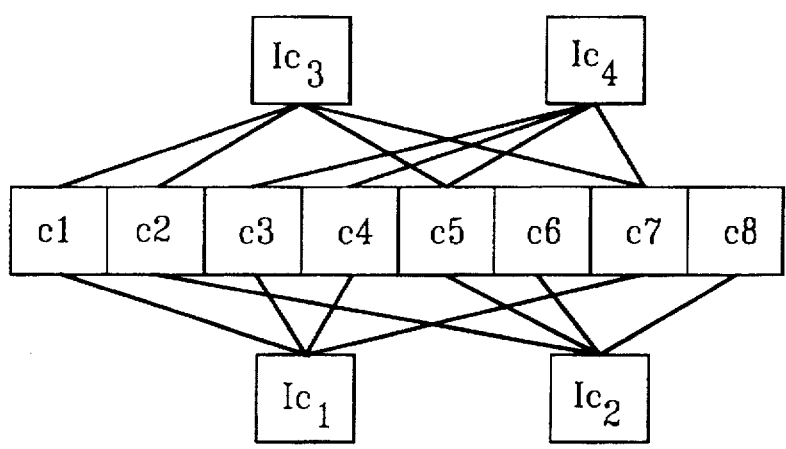

FIG. 3A shows an example of another encrypting function. The function $g_2$ consisting of associating with the group of eight characters c1 to c8 forming the secret code, four independent, linear combination, modulo 36 of these eight characters, whereby each linear combination can differ.

For example, the first character Ic1 of the image of the secret code associates the characters c1, c3, c4 and c7 of the secret code. The second character Ic2 of said image of the secret code associates the characters c2, c5, c6 and c8. The third character of the image of the secret code Ic3 associates the characters c1, c2, c5 and c7. The fourth character Ic4 of the image of the secret code associates the characters c3, c4, c5 and c7 of the initial secret code.

Figure 3B:
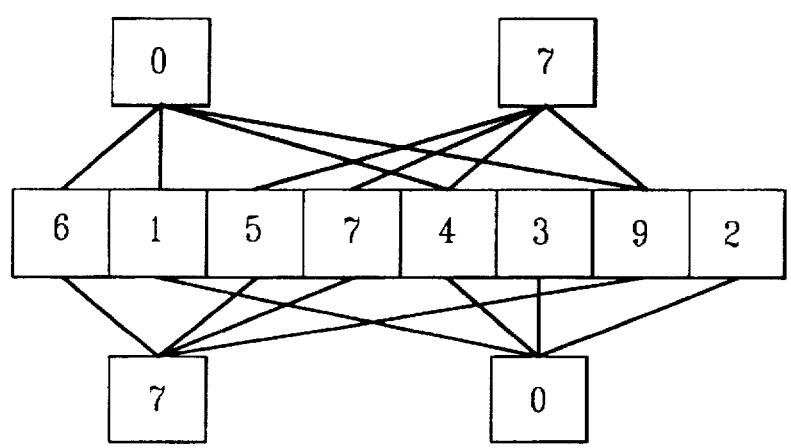

FIG. 3B shows the same example as in FIG. 3A, but in which to each character has been allocated a numerical value, which is the same as that given in the example of FIG. 2B, so that:

c1=6
c2=1
c3=5
c4=7
c5=4
c6=3
c7=9
c8=2

After encrypting, by the function g2, a secret code with eight characters c1 to c8, in which c1, ..., c8 have the above values, a secret code image 7007 will be obtained with Ic1=7, Ic2=0, Ic3=0, Ic4=7.

Thus, the process for the dissimulation of the secret code on the authentication device consequently has the advantage of not only detecting a possible typing error on the part of the user when the latter enters his secret code in the terminal, but more particularly of preventing access by dictionary on the part of a fraudulent user, because the image of the secret code stored on the floppy disk has such a large number of possible antecedent codes that a fraudulent user would have very little chance of finding the true secret code.

The above process for dissimulating a secret code in a floppy disk, smart card, or any other authentication device, can be used in a process for the verification of the secret code entered by a user wishing to access a central system from a terminal connected to a reader and able to read its authentication device.

For a better understanding of the invention, the process for verifying the secret code will now be described in the case where the authentication device is a floppy disk.

After the floppy disk has been introduced into the floppy disk reader associated with the terminal, this verification or checking process consists of the user entering his secret code in the terminal from which he wishes to connect to the central system. The terminal then checks whether the image, by the encrypting function g, of the secret code s which the user has typed corresponds to the image S stored on the floppy disk. If this is not the case, then the terminal refuses any connection to the central system. However, if this is verified, a stage of determining the non-encrypted secret key K is started and during which the terminal will be connected to the central system. This non-encrypted secret key K is determined from the inverse f of the encrypting function f of the key by the pass word (f being a reversible function) and from the encrypted key stored on the floppy disk, as is described in the aforementioned FR-A-2 690 257.

The authentication procedure performed from the computer terminal is connected to the central system will not be described here, because it is the same as that described in FR-A-2 690 257.

Figure 4:
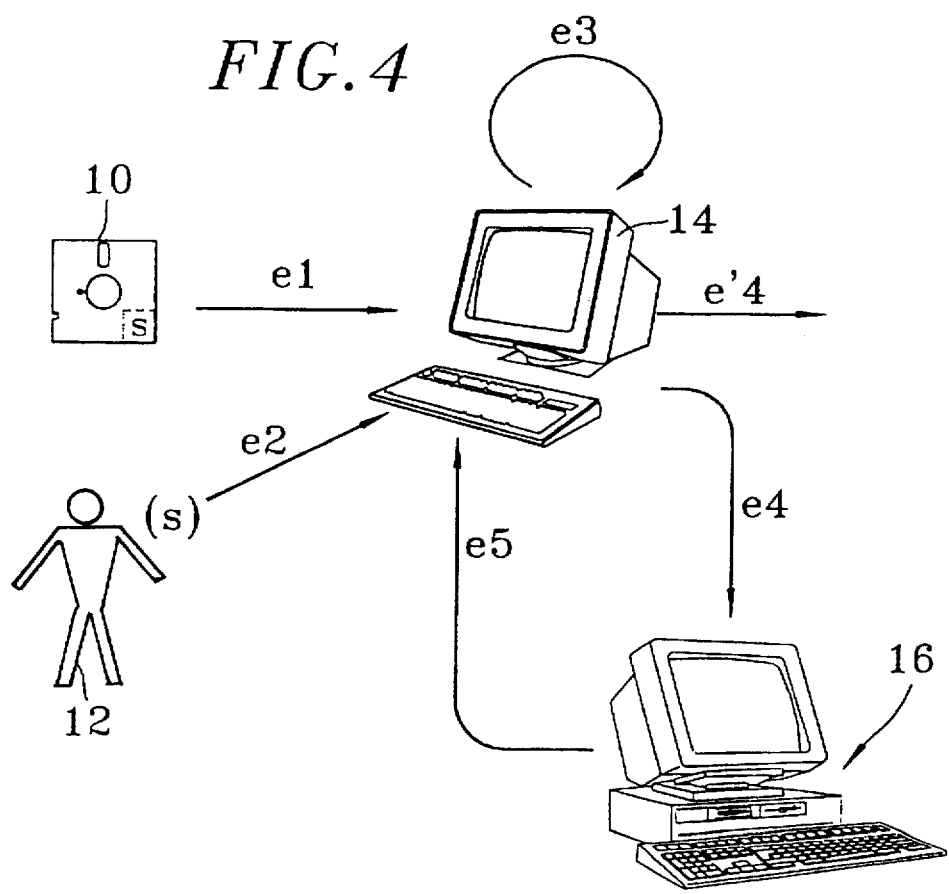
FIG. 4 the functional diagram of the secret code checking process.

A functional diagram of this secret code verification process is shown in FIG. 4. The floppy disk 10 is introduced into the computer terminal 14 during a stage e1. The user 12 then enters his secret code s in the terminal 14 during a stage e2. A stage e3 is then performed consisting of encrypting by the function g the secret code s entered by the user, followed by checking whether the image of the secret code by the function g corresponds to the secret code image s stored on the floppy disk 10. If this is not the case, then the verification process is abandoned (stage e'4) and consequently no authentication procedure by the central system is envisaged. However, if the verification proves to be correct, a stage e4 is performed and consists of determining the non-encrypted secret key K and sending it to the central system 16, which then starts the authentication procedure (stage e5) by means of an information exchange with the terminal 14.

Thus, the secret code verification procedure ensures a limitation of the number of connections to the central system, because only the secret codes accepted during the local verification of the secret code will be subject to an authentication procedure.

Moreover, as the secret code image is stored in the authentication device and not in a memory accessible to everyone, a fraudulent user wishing to know said secret code image would firstly have to acquire said authentication device, which helps to limit fraud.

We claim:

1. Process for the dissimulation of a secret code in a data authentication device (10) consisting of encrypting the secret code (s) by an encrypting function (g) for forming a secret code image (s) and storing said secret code image in the authentication device, characterized in that it consists of, beforehand, choosing an encrypting function (g) which is such that, with each stored secret code image corresponds a plurality of antecedent codes (s1, ..., sn) all differing from the secret code, but which, once encrypted by the encrypting function (g) have an image (s) identical to that of the secret code.

2. Process for the dissimulation of a secret code according to claim 1, characterized in that with the secret code having n characters (c1, ..., cn), the encrypting function (g) consists of associating with said n characters (c1, ..., cn) a secret code image of k characters with k<n.

3. Process for the dissimulation of a secret code according to claim 2, characterized in that the number k of characters of the secret code image is n/2.

4. Process for the verification of the secret code of a user wishing to access a central system from a terminal, characterized in that, said user (12) being provided with an authentication device (10) in which is stored the image (s) of the secret code by the encrypting function (g), according to any one of the claims 1 to 3, it comprises a stage (e3) of locally checking the secret code entered by the user and encrypted by the encrypting function, by comparison with the image of the secret code stored in the authentication device and then, if this is verified, an authentication stage (e5) by the central system (16).

* * * * *